Patented Feb. 27, 1923.

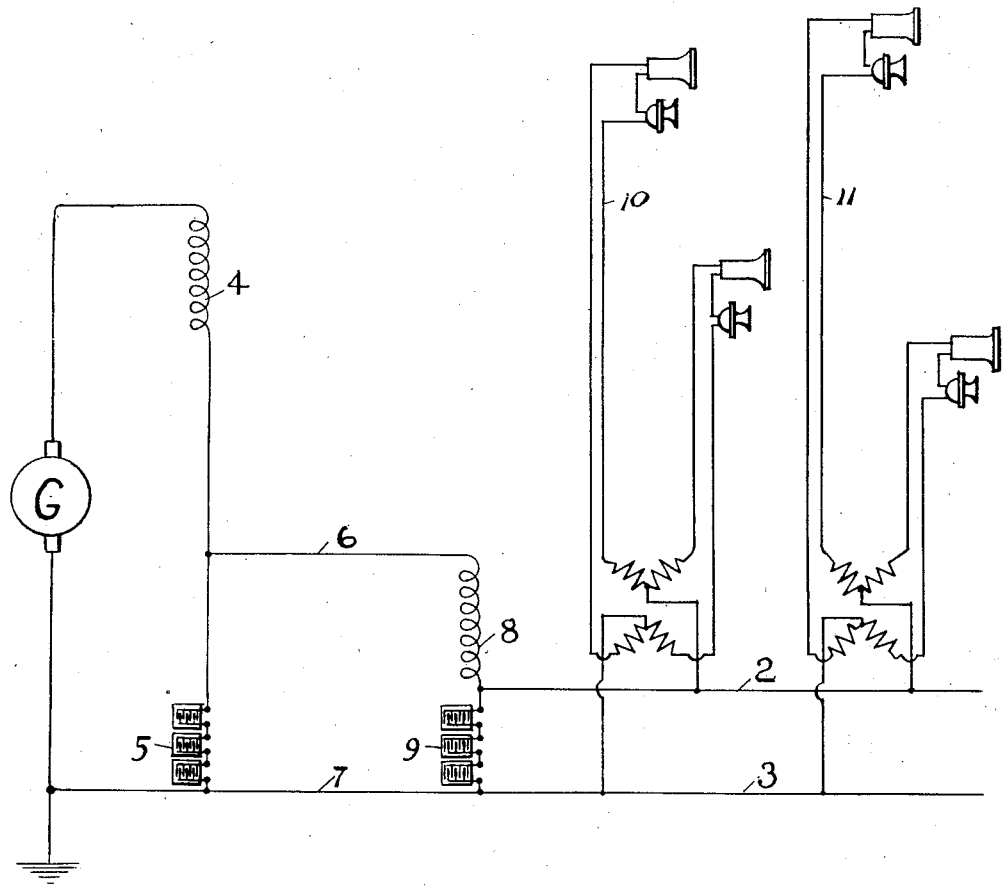

1,446,769

UNITED STATES PATENT OFFICE.

MICHAEL IDVORSKY PUPIN, OF NORFOLK, CONNECTICUT, AND MILLARD COLE SPENCER, OF EAST ORANGE, NEW JERSEY, ASSIGNORS TO CROCKER-WHEELER COMPANY, OF AMPERE, NEW JERSEY, A CORPORATION OF NEW JERSEY.

APERIODIC PILOT CONDUCTOR.

Application filed January 10, 1920. Serial No. 350,637.

*To all whom it may concern:*

Be it known that we, MICHAEL IDVORSKY PUPIN, of Norfolk, in the county of Litchfield and State of Connecticut, and MILLARD COLE SPENCER, of East Orange, in the county of Essex and State of New Jersey, both citizens of the United States of America, have invented certain new and useful Improvements in Aperiodic Pilot Conductors, of which the following is a specification.

The object of this invention is to provide an electrical connection between an electrical generator and particularly a direct-current dynamo-electric machine and an electric circuit, such as a telephone circuit, through which the direct current will be piloted with substantially undiminished voltage and current, but which will adequately suppress such pulsations in the electromotive force as may be incident to the operation of the generator, or which may otherwise reach the pilot conductor. Such pulsations are in effect superimposed alternating electromotive forces. They arise from various causes such as variation of magnetism occasioned by the passage of the alternating slots and teeth of the armature core in front of the pole pieces of the field magnets, and also from disturbances caused by the commutation and sparking at the brushes. While for simplicity of statement a dynamo-electric machine is indicated and it is shown how pulsations in the electromotive force generated therein may be suppressed, the invention may be applied with advantage to any circuit whereon undesirable pulsations are impressed.

A novel feature of the pilot conductor described in this application is the employment therein of a battery which offers a large reaction to a direct electromotive force, but has a small ohmic resistance and therefore offers a small reaction to an alternating electromotive force. Under certain conditions an aperiodic pilot conductor employing low resistance batteries offers a great advantage over aperiodic pilot conductors which do not employ active agents to perform the function of resistance reactions. These conditions will be described below.

In the accompanying sheet of drawings which forms a part of this application, the figure illustrates this invention diagrammatically.

A direct-current dynamo-electric machine G is shown which may be of any ordinary commercial type. Operating as a generator this machine delivers electrical power to main leads 2, 3 for any purpose requiring such power, such as telephone service, in the circuits of which it is desired that the pulsations in the electromotive force of audible frequencies originating in the dynamo-electric machine may be reduced to a negligible point. This is accomplished by providing a relatively high impedance element in the form of an inductance coil 4, and a relatively low impedance element to such alternating electromotive force in the form of a battery and desirably a storage battery 5 with a voltage approximately equal and opposed to that of the generator. These elements are connected as shown, the high impedance element 4 being in series in the line and the battery 5 being connected across the line beyond the high impedance element so that the two elements afford a return path to the generator in which they are in series. The impedance of the relatively high impedance element may reside in its reactance or in its ohmic resistance or both with respect to alternating electromotive force of the frequencies which it is desired to suppress. The total alternating electromotive force applied to these two elements in series is divided between them in proportion to their respective impedances to such electromotive force. The ratio between them should be three to one or higher for such alternating electromotive force. Thus only a small proportion of the original alternating electromotive force appears across the terminals of the battery and is applied to the leads 6, 7. In the same manner this reduced alternating electromotive force between these leads is applied to a second return path to the generator also consisting of a relatively high impedance element in the form of a coil 8, and a relatively low impedance element to such alternating electromotive force in the form of a storage battery 9 which divide this reduced alternating electromotive force in proportion to their respective impedances. The ratio between these impedances should be three to one or higher so that only a small portion of the reduced alternating electromotive force on the leads 6, 7 is applied to the main leads 2, 3. Without intending to alter the above statements as to the ratio to be maintained between the impedance in the line elements and the battery elements it is desirable that the inductance elements in the line be kept small, say each about one half of a milli-henry, when the storage batteries have a large current capacity and the generator supplies direct current of a hundred or more amperes. The ohmic resistance of each of the high impedance coils is kept small, so that the electromotive force of the direct current is transmitted or piloted between the dynamo-electric machine and the storage batteries and the main leads without material loss of energy.

Two or more sections are required for the purpose intended. Two are herein shown, and this number with suitable impedance elements and batteries has been found to reduce the superimposed alternating electromotive force to a point where its effect is not objectionable. However, this invention is not limited to two sections, as more may be added.

Any practicable element used to provide impedance or reactance in series in the line which has inductance will also possess resistance, and it is important in order to attain high efficiency that the inductance reaction in these elements should be large as compared with the resistance reaction thereof. Inductance is not essential to operation, but without it the efficiency would be low. The resistance reaction, that is the resistance drop of potential in the impedance element 8 is also kept low to avoid appreciable overcharging of the storage battery 5.

By increasing the dynamo-electric machine voltage slightly above that of the storage batteries, a part of the direct current from it may be caused to flow through the storage batteries, and thus serve to charge them, without in any way affecting the action of these storage batteries in preventing alternating electromotive force, originating in the dynamo-electric machine, from passing out to the main leads. The electrical energy thus stored in these batteries is then available for supplying current to the leads at times when the dynamo-electric machine is not running or when its voltage is lower than that of the storage batteries.

The aperiodic pilot conductor herein described is eminently suitable when it is desired to employ dynamo-electric generators of large power, say above 5 kilowatts, to supply a large number of telephonic and telegraphic apparatus with direct current at comparatively low voltage, say 30 to 40 volts. But it is obvious that the invention will be in certain cases also suitable for small power, as for instance when it is required that a low voltage storage battery be employed to heat the filaments of vacuum tube amplifiers and also at the same time supply power for a motor which drives a high potential generator supplying high voltage and small current for the wing circuits of the same vacuum tubes. In such a case the storage batteries would drive the dynamo-electric machine and the main leads would supply current to the filaments of the vacuum tubes.

We claim:—

1. An aperiodic conductor connected between a receiving circuit and a source of direct current subject to a superimposed pulsating electromotive force for the suppression of the pulsating component in a series of successive steps, and consisting of sections in series, each comprising a battery element in shunt across the line and an element in series with the battery element and the source and with the line, the drop of potential in the element in series with the line being much greater than the drop of potential in the battery element for currents of the frequencies which it is desired to suppress, substantially as described.

2. An aperiodic conductor connected between a receiving circuit and a source of direct current subject to a superimposed pulsating electromotive force for the suppression of the pulsating component in a series of successive steps, and consisting of sections in series, each comprising a battery element in shunt across the line and an impedance element in series with the battery element and the source and with the line, the impedance of the impedance element being much greater than the resistance of the battery element for currents of the frequencies which it is desired to suppress, substantially as described.

3. An aperiodic conductor connected with a receiving circuit and a source of direct current subject to a superimposed pulsating electromotive force for the suppression of the pulsating component in a series of successive steps, and consisting of sections in series, each comprising a battery element in shunt across the line and an inductance element in series with the battery element and the source and with the line, the reactance of the inductance element being much greater than the resistance of the battery element for currents of the frequencies which it is desired to suppress, substantially as described.

4. In combination with a dynamo-electric machine subject to a superimposed pulsating electromotive force, an aperiodic conductor connected between a receiving circuit and the dynamo-electric machine for the suppression of the pulsating component in a series of successive steps, and consisting of sections in series, each comprising a battery element and an element in series with the battery element and the dynamo-electric machine and with the line, the drop of potential in the element in series with the line being much greater than the drop of potential in the battery element for currents of the frequencies of the superimposed pulsating electromotive force, substantially as described.

5. In combination with a dynamo-electric machine subject to a superimposed pulsating electromotive force, an aperiodic conductor connected between a receiving circuit and the dynamo-electric machine for the suppression of the pulsating component in a series of successive steps, and consisting of sections in series, each comprising a battery element and an impedance element in series with the battery element and the dynamo-electric machine and with the line, the impedance of the impedance element being much greater than the resistance of the battery element for currents of the frequencies of the superimposed pulsating electromotive force, substantially as described.

6. In combination with a dynamo-electric machine subject to a superimposed pulsating electromotive force, an aperiodic conductor connected between a receiving circuit and the dynamo-electric machine for the suppression of the pulsating component in a series of successive steps, and consisting of sections in series, each comprising a battery element and an inductance element in series with the battery element and the dynamo-electric machine and with the line, the reactance of the inductance element being much greater than the resistance of the battery element for currents of the frequencies of the superimposed pulsating electromotive force, substantially as described.

MICHAEL IDVORSKY PUPIN.
MILLARD COLE SPENCER.